US 6,695,544 B2

(12) United States Patent
Knudson et al.

(10) Patent No.: US 6,695,544 B2
(45) Date of Patent: Feb. 24, 2004

(54) ENVIRONMENT RESISTANT RETAINING WALL PLANTER BLOCK AND METHODS OF USE THEREOF

(75) Inventors: Edward Alan Knudson, Zimmerman, MN (US); John Fitzgerald Dolan, Golden Valley, MN (US)

(73) Assignee: New Technology Resources, Inc., Golden Valley, MN (US)

( * ) Notice: Subject to any disclaimer, the term of this patent is extended or adjusted under 35 U.S.C. 154(b) by 0 days.

(21) Appl. No.: 10/007,957

(22) Filed: Nov. 2, 2001

(65) Prior Publication Data

US 2003/0086764 A1 May 8, 2003

(51) Int. Cl.[7] .............................. A01G 9/02; B65D 6/45; E02D 17/20; E02D 29/02
(52) U.S. Cl. .................... 405/284; 47/66.3; 47/66.5; 47/86; 220/601
(58) Field of Search .................... 405/284, 286; 47/65.5–87; 4/450; 206/509, 511; 220/601, 4.27

(56) References Cited

U.S. PATENT DOCUMENTS

| 1,340,680 | A | * | 5/1920 | Zimmerman | 4/450 |
|---|---|---|---|---|---|
| 2,741,777 | A | * | 4/1956 | Loye | 4/450 |
| 4,048,682 | A | * | 9/1977 | Smith | 4/450 |
| D255,787 | S | * | 7/1980 | Morehead, Jr. | 405/286 |
| RE34,314 | E | | 7/1993 | Forsberg | 52/562 |
| 5,294,216 | A | | 3/1994 | Sievert | 405/286 |
| 5,471,808 | A | * | 12/1995 | De Pieri et al. | 52/603 |
| 5,688,079 | A | | 11/1997 | Bolduc et al. | 405/286 |
| 5,832,687 | A | * | 11/1998 | Willemsen | 52/592.6 |
| 6,024,626 | A | * | 2/2000 | Mendelsohn | 446/92 |
| 6,062,772 | A | | 5/2000 | Perkins | 405/284 |
| D429,004 | S | | 8/2000 | Strand et al. | D25/113 |
| 6,571,529 | B2 | * | 6/2003 | Knudson et al. | 52/745.05 |

* cited by examiner

*Primary Examiner*—Robert E. Pezzuto
*Assistant Examiner*—Tara L. Mayo
(74) *Attorney, Agent, or Firm*—Fredrikson & Byron, PA

(57) ABSTRACT

A retaining wall planter block that is resistant to damage and wear caused by the environment in which it is placed, but also accommodates the growth of desired vegetation. The planter block contains a fill material that is conducive to vegetation growth, and has apertures for the emerging vegetation. The deterioration resistant planter block is generally a hollowed frame or shell of a deterioration resistant material that is light-weight and is configured to accept and retain any type of organic filling material and seeds. The filling material provides weight and stability to the retaining wall planter block and also provides weight, stability and security to a retaining wall constructed of such planter blocks, as well as suitable growth medium for the vegetation.

19 Claims, 6 Drawing Sheets

ENVIRONMENT RESISTANT RETAINING WALL PLANTER BLOCK AND METHODS OF USE THEREOF

The present invention relates to a retaining wall planter block that is resistant to damage and wear caused by the environment it is placed into. The deterioration resistant block is generally a hollowed frame or shell of a deterioration resistant material that is light-weight, includes a plurality of apertures and is configured to accept one or more fill materials that may include seeds. Generally, at least one of the fill materials is suitable for growth of vegetation that protrudes through the plurality of apertures positioned on the block. The filling material also provides weight and stability to the retaining wall planter block and also provides weight, stability and security to a retaining wall constructed of such blocks.

BACKGROUND OF THE INVENTION

The use of retaining walls to protect and beatify property in all types of environmental settings is a common practice in the landscaping, construction and environmental protection fields. Walls constructed from various materials are used to outline sections of property for particular uses, such as gardens or flower beds, fencing in property lines, reduction of erosion, and to simply beautify areas of a property.

Numerous methods and materials exist for the construction of retaining walls. Such methods include the use of natural stone, poured in place concrete, masonry, landscape timbers or railroad ties. In recent years, segmental concrete retaining wall units, sometimes known as keystones, which are dry stacked (i.e., built without the use of mortar), have become a widely accepted product for the construction of retaining walls. Examples of such units are described in U.S. Pat. No. RE 34,314 (Forsberg) and in U.S. Pat. No. 5,294, 216 (Sievert).

However, many of the materials utilized in the construction of retaining walls are susceptible to deterioration and/or are not very aesthetically appealing. The ability of these retaining walls to withstand sunlight, wind, water, general erosion and other environmental elements is a problem with most retaining wall products. Many materials utilized in retention of shorelines are subject to immediate deterioration and/or are not as aesthetically appealing as one would desire.

Furthermore, many materials utilized on shoreline structures are difficult to maintain due to the awkward location in the water and also the prevalent growth and presence of undesirable organic materials that can get caught and flourish in such a structure. For example, many lakeshore or ocean side properties utilize riprap as a retention device for prevention of erosion. Riprap is a configuration of large to medium size stones placed along the shoreline. A problem with waterfront properties that use a continuous wall of typical riprap is the shoreline will retain some undesirable organic material or will accumulate additional organic material brought in by the water. This usually leads to an unmanageable and aesthetically displeasing shoreline or higher maintenance. Furthermore, the riprap is never uniform in color and size and therefore does not as provide the most aesthetically pleasing shoreline or complete coverage of the shoreline. The lack of uniform shoreline coverage allows for some erosion, collection of various materials and the growth of undesirable weeds.

As previously suggested, a particular concern is the utilization of erosion protection materials in water shorelines. Installing riprap, seawalls, or other structures result in the "Hardening" of the shoreline. This can lead to the disruption of spawning areas, increases erosion in non-protected shoreline, and destroys the natural habitat required by a variety of organisms. Alternatively, leaving the shoreline natural can lead to erosion, cause an unmanageable and unusable shoreline, create high maintenance, and inhibit an aesthetically pleasing property.

Another problem with materials normally utilized in the construction of retaining walls, such as poured in place concrete, masonry, landscape timbers, railroad ties or keystones is that regulations in most states and counties prohibit their use in or near bodies of water because of the crumbling or deterioration of the material into the body of water over time. Many of these retaining wall materials dissolve, crumble, break apart and/or float into the body of water for which they line causing problems with the shoreline and pollution of the water. For example, the average life of a concrete block or keystone in water is approximately a couple of years. A need exists for a retaining wall, which would be resistant to such deterioration. Additionally the removal of a natural habitat for growth of desirable organic materials, such as vegetation and organisms, by insertion of such retaining walls presents environmental problems.

An additional concern that exists in the construction of retaining walls is the weight of the blocks or materials. Concrete blocks, large stones, timbers or keystones can be heavy to move into the wall location and maneuver when constructing the wall. Many locations for which retaining walls are constructed are positioned in awkward terrain. Heavy building materials are difficult to move into the location and furthermore are difficult to position when constructing the retaining wall thereby adding additional cost and labor for installation. However, the heavy materials are needed once the wall is constructed to provide stability and security to the structure. Therefore, easy to install light-weight units used for the construction of a retaining wall, which can be weighted once placed into position to provide retention of the block and thereby stabilize the completed retaining wall, would be beneficial to construction of such structures.

SUMMARY OF THE INVENTION

As previously mentioned the present invention relates to a retaining wall planter block that is resistant to damage and wear caused by the surrounding environment. The deterioration resistant block is generally a hollowed frame or shell of a deterioration resistant material that is light-weight, includes a plurality of apertures and is configured to accept one or more filling materials that may include seeds. The filling material provides weight and stability to the retaining wall planter block and also ultimately provides stability and security to the retaining wall constructed of such blocks. Furthermore, one or more of the filling materials placed into the block is generally suitable for the growth of vegetation, such as grass, moss, or other vegetation native to the surrounding environment.

More specifically, the deterioration resistant planter block comprises a top panel, a bottom panel, a wall assembly and an optional anchoring device. One or more chambers are created by adjoining the top panel, bottom panel and wall assembly. The chambers are adapted for receiving and retaining one or more fill materials, such as sand, dirt, gravel, pea rock, peat, or any other similar material, which provides permanent weighting and stability of the planter block and also provides the seeds nutrients for exceptional vegetation growth. The planter block further comprises a plurality of apertures that are adapted to allow vegetation to grow from the apertures to the exterior of the planter block.

Embodiments of the present invention include a deterioration resistant retaining block for use in constructing retaining walls on properties that are exposed to harsh environments, such as waterfront properties. The deterioration resistant planter blocks are particularly useful for properties near water or underwater due to their resistance to degradation and adaptation to the surrounding environment. As previously suggested, the planter block is configured to provide structural scaffolding for vegetation growth. Furthermore, the scaffolding provides stability to a surface, such as a bank, ravine, shoreline or the like, thereby preventing erosion, as well as providing an optimum environment conducive to vegetation growth that is aesthetically acceptable. It is also noted that the deterioration resistant blocks could also be used for other landscaping applications wherein an easy to install, light-weight retaining wall block that includes vegetation is desired. Therefore, the deterioration resistant planter wall block could be utilized to construct any form of wall or fence structure, such as a vine covered wall.

Generally, the planter block possesses light-weight characteristics before it is filled with a fill material that may include seeds. As previously mentioned, embodiments of the present invention can be waterproof and may be filled with any type of fill material located at the site or applied for optimum growing characteristics, such as soil, peat, rocks, sand, gravel, pea rock or other similar materials. The filling characteristic of the deterioration resistant block means that when the block is not filled or only partially filled it is very light-weight. The light-weight feature provides individuals constructing such walls the advantage of easily moving large numbers of the blocks to the site of construction with relative ease. Furthermore, the lightweight characteristic of the blocks allows for easy maneuvering of the blocks into final position when constructing the wall and still allows for the stability of a heavy block after it is completely filled. These characteristics are met by the block being made of a lightweight material and also configured to receive a heavy fill material once it is about to be placed or has been placed in its final position on the retaining wall. Additional configurations of the present invention may include pre-packaged blocks where the seeds and/or suitable fill material are tailored for the installation site.

Additionally, embodiments of the present invention further satisfy an unmet landscaping need for shorelines in that the deterioration resistant planter blocks are easily manufactured. Examples of possible manufacturing methods include but are not limited to injection-molding, dip-molding and blow-molding. Also any high volume application for production may be utilized in manufacturing the present invention. The individual units are light-weight, attractive, easy to install, prevent shoreline and other terrain erosion and may compliment existing traditional retaining wall block. The deterioration resistant blocks are also waterproof, can withstand ice damage due to their flexible nature and are easily replaced in case of damage. Furthermore, they are rugged and very low maintenance. Moreover, embodiments of the present invention are easily transportable and storable due to their light-weight and potential stacking features.

The lightweight material of the block makes it easier for individuals to install the planter block made of a deterioration resistant material themselves rather than cement block, timbers, keystones and the like. The minimum weight of most regular garden block is approximately 30–50 lbs, whereas embodiments of the present invention may be approximately 0.1–10 lbs. Of course, weight may vary depending on the size and materials utilized in manufacturing embodiments of the present invention. Also, as previously mentioned the blocks of the present invention retain the final stability and weight by filling the block with an appropriate fill material and seeds either prior to or after it has been permanently installed.

The embodiments of the present invention are resistant to deterioration, such as wear, crumbling and breaking. Therefore, the deterioration resistant block does not have to be replaced as often and/or increases the lifespan of the retaining wall. The block has approximately the lifespan of at least 5–10 times the life of a regular keystone. The increased lifespan of the block translates to fewer or no occurrences of replacement of individual blocks or the potential complete reconstruction of the entire wall. Furthermore, retaining wall materials, such as concrete block, timbers and keystone, are typically not used in water applications because they dissolve, crumble and/or break down over time and exposure. The durability and resistant characteristics of the present invention reduce and prevent this deterioration, therefore making it very beneficial for all applications that come in contact with water.

Another advantage of the retaining wall planter block of the present invention is the block is resistant to ice damage when installed around a body of water that freezes. When ice expands and/or moves it shifts, tears and damages various types materials utilized for shoreline retention, such as keystone, concrete block, rip rap, landscape timbers or anything rigid. Embodiments of the present invention can be manufactured with a material that has flexibility and would flex in a similar way as a Rubbermaid® trash can flexes. Considering that the deterioration resistant block would be filled with a fill material, the deformation would be minimal, but still enough to prevent damage to the retaining wall planter block and/or the entire wall. Furthermore, upon melting or shifting of the ice the deterioration resistant block returns to its original configuration.

Another advantage of embodiments of the present invention relates to the high cost of waterfront property and people's inclination to improve their property to keep it well-maintained and aesthetically pleasing. Embodiments of the present invention allow for controlled growth of vegetation to reestablish the natural environment and preserve the integrity of the shoreline that may be susceptible to erosion. Furthermore, the planter blocks of the present invention provide a softer shoreline that is amenable to native shoreline vegetation and organisms. Therefore, the planter blocks of the present invention provide an optimal medium for the natural habitat, as well as an aesthetically pleasing and structurally sound shoreline.

Many waterfront properties suffer water damage when water levels rise above the shoreline. The retaining wall planter block of the present invention is a solution to water retention and erosion problems in such areas of threatening high or fluctuating water levels. Furthermore, the retaining wall planter block poses a solution in locations where there is a flood plane or areas that are washed out by any type of water movement. Sandbags have been a solution to such problems, but are not a permanent or aesthetically pleasing solution. The retaining wall planter block can replace sand bags in an area for which a more permanent and aesthetically pleasing alternative is desired.

As previously suggested, the deterioration resistant retaining wall planter block can comprise any type of shape, configuration, color and design. In addition the retaining wall planter block may include any design or color located anywhere on any panel or wall of the block. Embodiments of the present invention may be shaped like Keystone® block, concrete block, brick or any other configuration that is desired. Therefore, the present invention provides an aesthetically pleasing solution and replacement for materials, including timbers, concrete or sandbags, presently utilized in retaining wall construction.

DETAILED DESCRIPTION OF THE INVENTION

Figure 1:
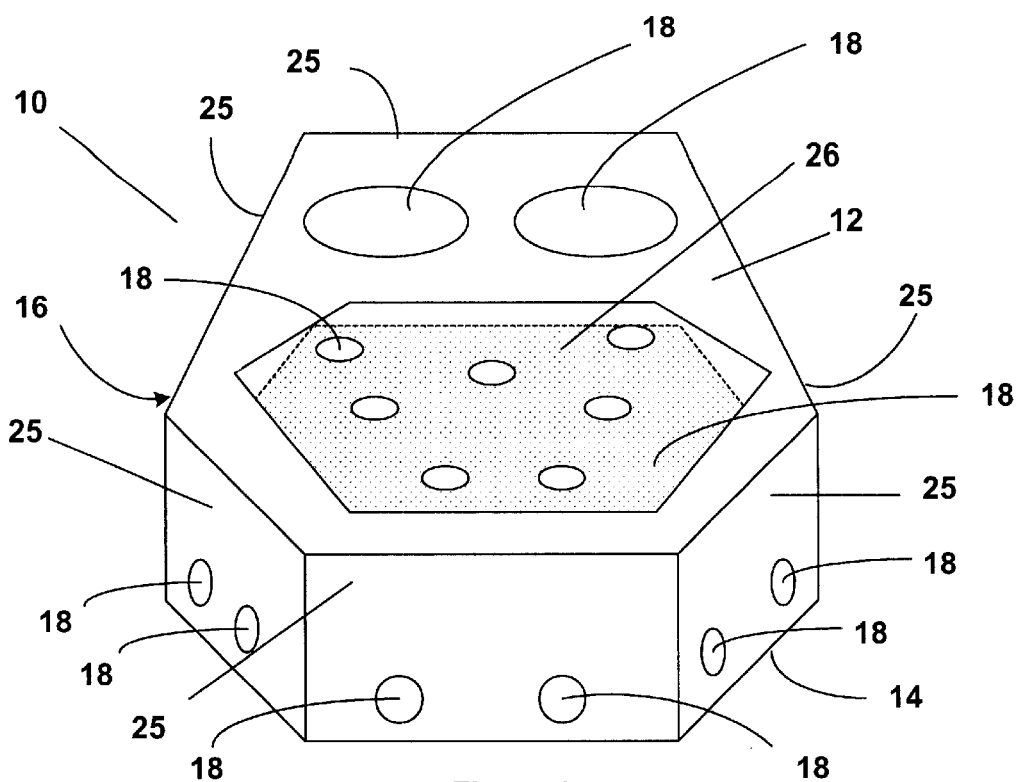
FIG. 1 is a perspective view of one embodiment of a deterioration resistant retaining wall planter block.

FIG. 1 depicts one embodiment of the deterioration resistant retaining wall planter block 10 comprising a top panel 12, a bottom panel 14 and a wall assembly 16. Generally, the top panel 12 includes one or more apertures 18. The apertures 18 may be of any size and shape suitable for the receiving of fill material and/or the emergence of growing vegetation from the planter block 10. The bottom panel 14 includes a relatively flat surface or contoured to rest uniformly with the top panel 12 of one or more blocks 10 positioned below.

Figure 2:
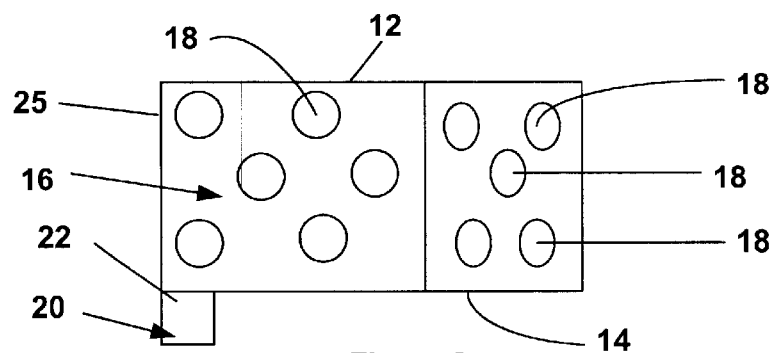
FIG. 2 is a side view of a deterioration resistant retaining wall planter block which includes a retaining flange.

The bottom panel 14 may also include or be adjoined to an anchoring device 20. FIG. 2 depicts the side view of an embodiment of the present invention, which includes an anchoring device 20 in the form of a retaining flange 22 adjoined to the bottom surface 14 of the block 10. On a constructed wall, each retaining flange 22 is a wall retention device that operates to inhibit outward movement of the wall. Normally, the retaining flange 22 extends downward from the back of the bottom panel 14 and rests against the back of the retaining block 10 located below the bottom panel 14. The retaining flange 22 may be a unitary piece extending downward from the back of the retaining block 10 or a series of fingers extending downward from the back of the retaining block 10.

Figure 3:
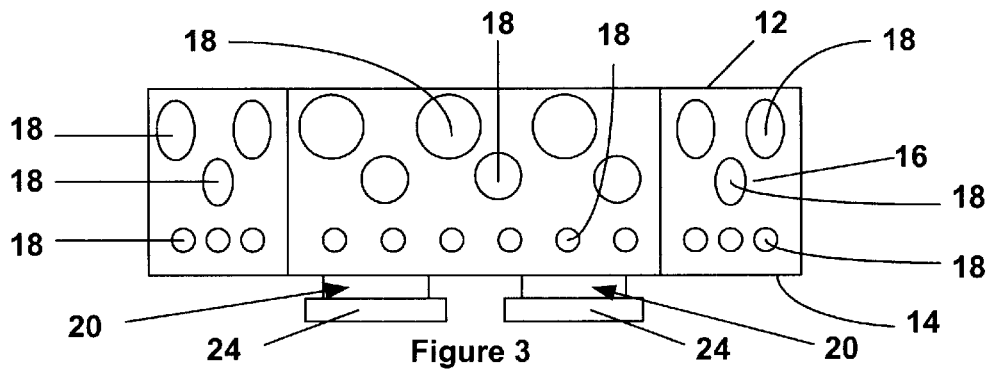
FIG. 3 is a front view of a deterioration resistant retaining wall planter block which includes insertable pegs.
Figure 4:
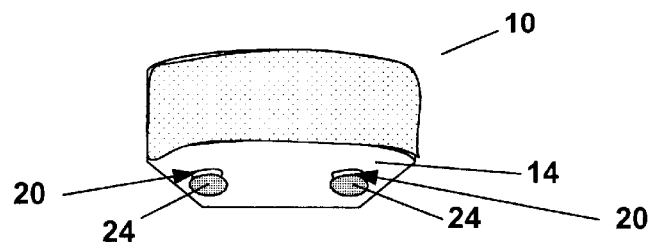
FIG. 4 is a perspective view of a deterioration resistant retaining wall planter block which includes lockable insertable pegs.
Figure 5:
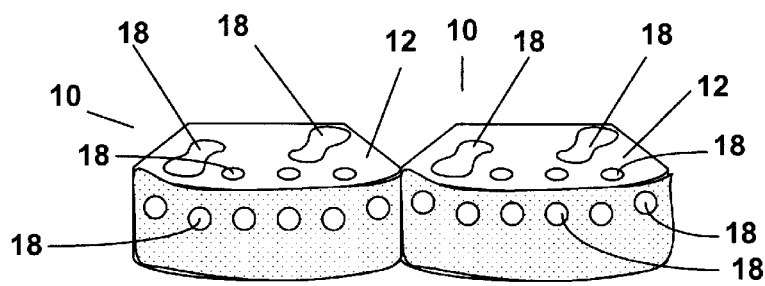
FIG. 5 is a perspective view of deterioration resistant retaining wall planter blocks which includes apertures for receiving lockable insertable pegs.

Another embodiment of the present invention may include an anchoring device 20 in the form of insertable pegs 24. In FIG. 3 the insertable pegs 24 are adjoined to the bottom panel 14 and are configured to be securely receivable in the apertures 18 of an additional adjoining top panel 12 of another retaining block 10. The insertable pegs 24 can be made of any shape and size, which can be securely fit into the apertures 18 of the top panel 12. FIGS. 4 and 5 depict another type of peg configuration. FIG. 4 illustrates a bottom panel 14 of one embodiment of the present invention wherein the insertable pegs 24 are lockable. The insertable pegs 24 are positioned on the bottom panel 14 at an angled configuration. The top panel 12, illustrated in FIG. 5, includes apertures 18 adapted to receive the lockable insertable pegs 24. In operation a block 10 is maneuvered so that the pegs 24 of one block are inserted into the apertures 18 of another block. The block 10 possessing pegs 24 is then turned into position thereby locking the two blocks together. The pegs 24 on a block 10 may also be configured to fit into the apertures of two adjacent blocks positioned below. This application is beneficial if the blocks of adjacent rows are staggered in positioning. See FIG. 6 for an illustration of a staggered retaining wall.

The deterioration resistant retaining block 10 also includes a wall assembly 16, which is also depicted in FIGS. 1–3. The wall assembly 16 comprises one or more outside walls 25 that may generally include a plurality of apertures 18. Embodiments of the present invention include wall assemblies 16 that are adjoined to the top panel 12 and bottom panel 14. The adjoinment of the wall assembly 16 to the top panel 12 and bottom panel 14 creates a chamber 26 located within the retaining block 10. The chamber 26 is normally filled with materials that are conducive to vegetation growth such as dirt, peat, sand, gravel, growth sponges or other like materials. The fill materials also provide weight and structure stability to the retaining planter block 10 and the entire retaining wall.

Figure 9:
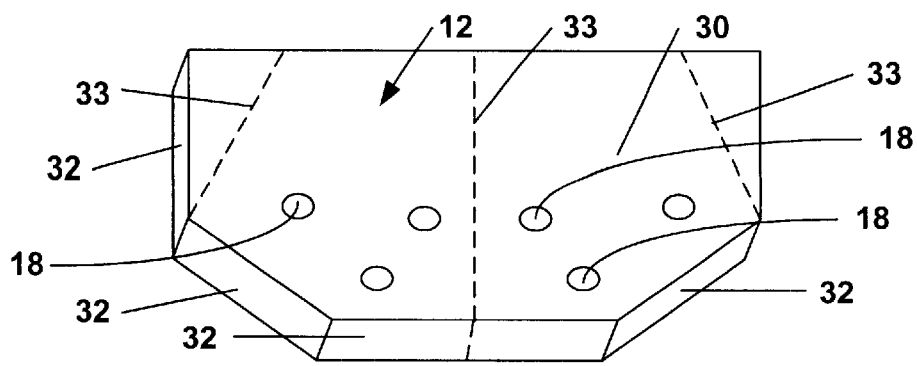
FIG. 9 is a perspective view of a cover of a deterioration resistant retaining wall planter block.
Figure 7:
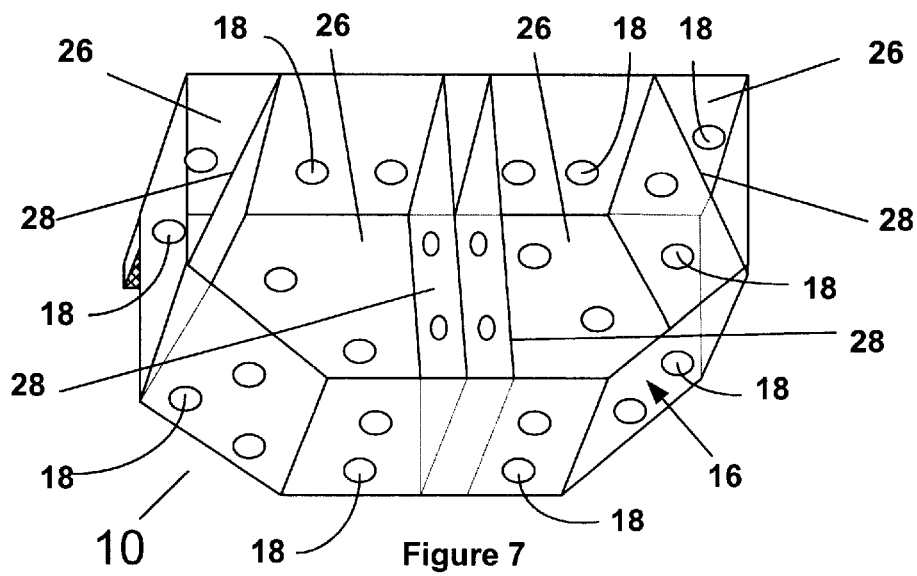
FIG. 7 is a perspective view of a deterioration resistant retaining wall planter block containing multiple chambers.
Figure 8:
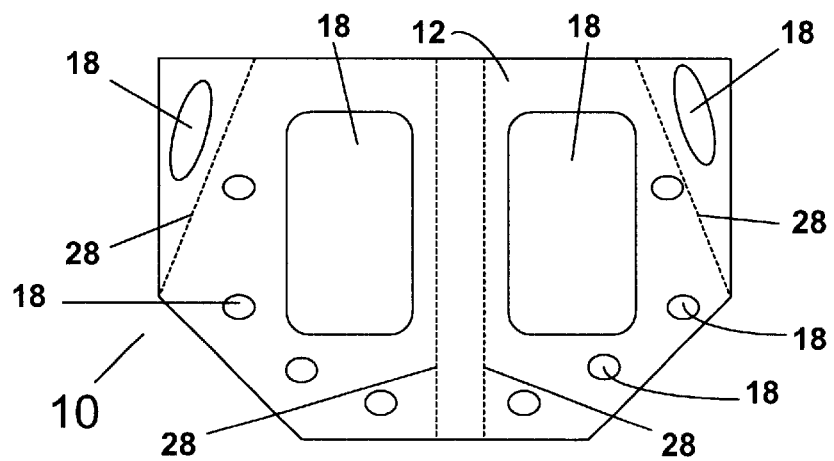
FIG. 8 is a top view of a multiple chamber deterioration resistant retaining wall planter block that includes a top panel with multiple apertures.

Another embodiment of the present invention is depicted in FIGS. 7–9. The embodiment shown in FIG. 7 comprises a deterioration resistant retaining block 10 with the top panel 12 removed, wherein the wall assembly 16 defines more than one chamber 26 within the retaining planter block 10. The multiple chambers 26 are defined by interior partitions 28. The interior partitions 28 may also be utilized to add additional support to the retaining planter block 10. The interior partitions 28 may also include apertures 18 for growth of vegetation and/or growth of vegetation roots between the chambers 26 of the planter blocks 10.

FIG. 8 depicts one embodiment of the top panel of a partitioned retaining planter block 10. The interior partitions 28 are within the interior of the retaining block 10 and are depicted by dashed lines. In this embodiment of the present invention, the top panel 12 is permanently fixed to the wall assembly 16 and includes multiple apertures 18 to accommodate filling of each individual chamber 26 with appropriate fill material, such as dirt, peat, sand, gravel or any other suitable material. The apertures 18 also provide openings for vegetation growth.

FIG. 9 depicts another possible embodiment of the top panel 12, which is configured in a cover formation that may be adapted to securely fit over the retaining planter block 10 illustrated in FIG. 7. The top panel 12 of this embodiment comprises a closed section 30 that includes overlapping edges 32, which overlap securely over the outside walls of the wall assembly 16. However, the top panel may also secure to the wall assembly 16 in other ways, such as locking tabs, twist locks, clamps, clips, adhesives, ultrasonic welding, RF welding, or any other means of attachment or fastener. The top panel 12 of this embodiment may optionally be hingedly secured to the retaining planter block 10 by any type of hinge device (not shown), thereby providing a unitary configuration of the retaining wall planter block 10. Finally, the top panel 12 may also include apertures for accommodating the growth of vegetation.

Figure 10:
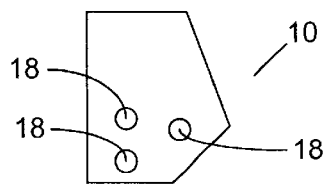
FIG. 10 is a top view of a section of a deterioration resistant retaining wall planter block.

Multiple chambers 26 also allow for the retaining block 10 to be cut into various shapes and still maintain a chamber that can receive and retain fill materials and seeds. FIG. 10 depicts a section of the retaining block 10 as shown in FIG. 7 wherein the corners have been removed and the block 10 has been cut in half. The ability to cut the retaining planter block 10 and still retain the same features is particularly useful in preparing ends and awkward segments of retaining walls. Dashed lines depicted in FIG. 9 illustrate alternate cover configurations to conform to the various shapes of a retaining planter block 10 or portions thereof.

Figure 11:
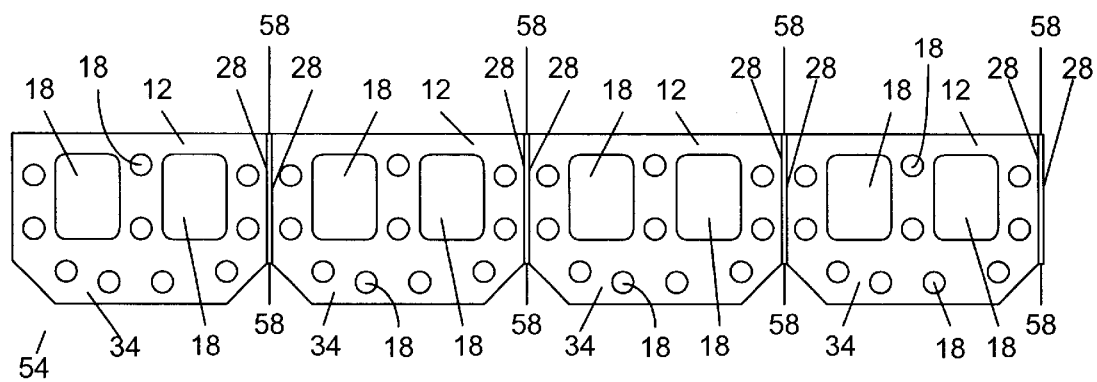
FIG. 11 depicts a top view of a multi-unit deterioration resistant retaining wall planter block.
Figure 12:
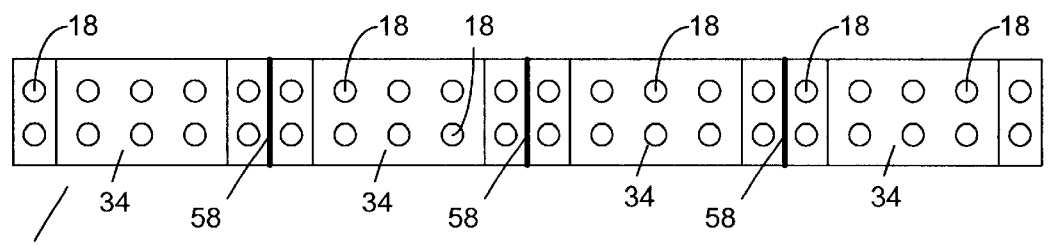
FIG. 12 depicts a front view of a multi-unit deterioration resistant retaining wall planter block.

An additional embodiment of the present invention is depicted in FIGS. 11 and 12. FIG. 11 illustrates a top view of a retaining planter block 54 wherein multiple units 34 are incorporated into a single planter block 54. A single multi-unit planter block 54 provides the appearance of multiple retaining blocks present in a single structure. The top panel 12 may be integral to the block or may comprise a single sheet, which covers each unit 34 or multiple sheets in which each sheet covers a single unit of the multi-unit block. Furthermore, the top panel 12 may include apertures 18 for vegetation growth and optionally for filling. The interior of the retaining planter block 54 of this embodiment includes one or more interior partitions 28.

Figure 6:
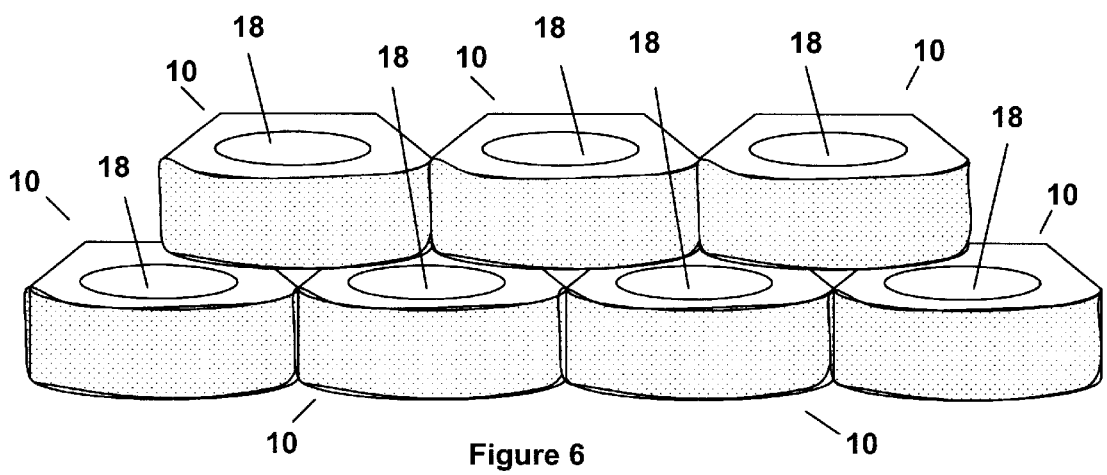
FIG. 6 is a perspective view of a deterioration resistant retaining wall that includes staggered rows.

FIG. 12 depicts the front view of the multi-unit retaining planter block 54, which has the appearance of multiple separate units 34. These multiple separate units 34 provide the appearance similar to the partial assembly of a retaining wall comprising a plurality of individual blocks, such as depicted in FIG. 6. The multi-unit retaining planter block 54 may be a unitary structure or may include multiple components, such as a multi-unit planter block 54 including a single top panel (not shown), similar to the top panel depicted in FIG. 9.

Figure 13:
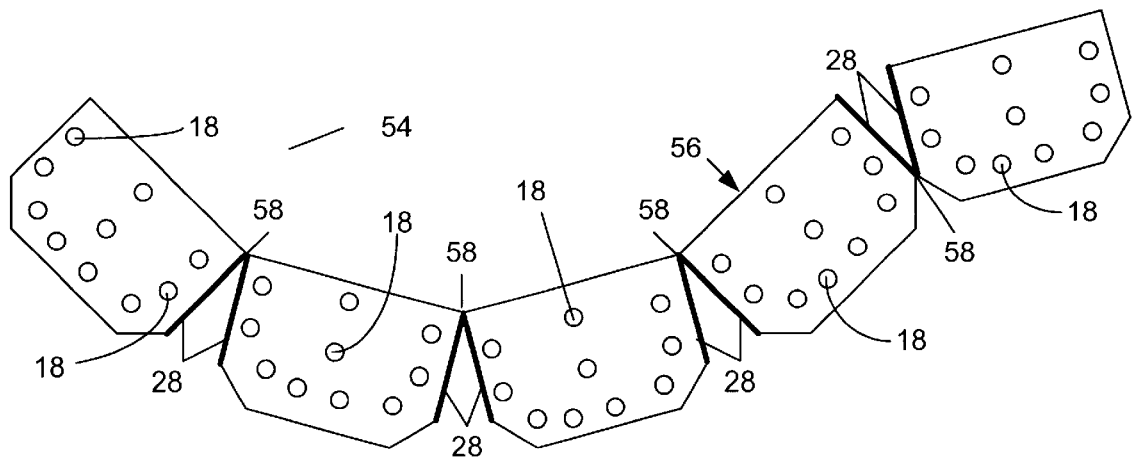
FIG. 13 depicts a top view of a multi-unit deterioration resistant retaining wall planter block with disengaged tabs.
Figure 14:
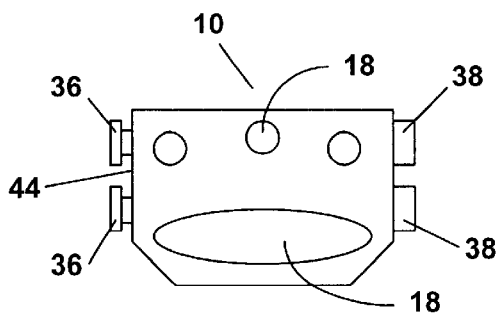
FIG. 14 depicts a top view of a deterioration resistant retaining wall planter block that includes interlocking keys and locks.
Figure 15:
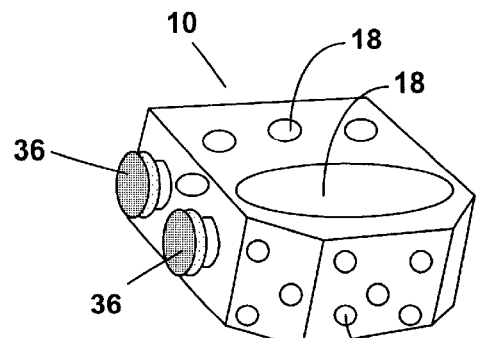
FIG. 15 depicts a left side perspective view of the deterioration resistant retaining wall planter block of FIG. 14.
Figure 16:
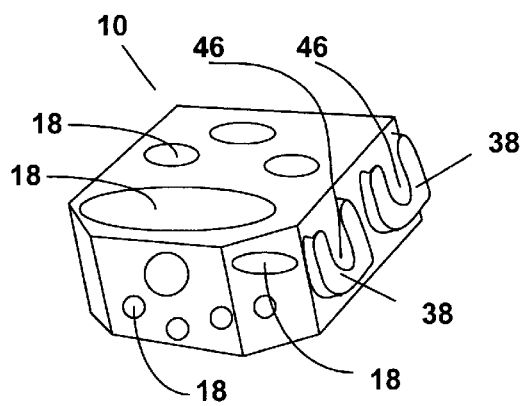
FIG. 16 depicts a right side perspective view of the deterioration resistant retaining wall planter block of FIG. 14.
Figure 17:
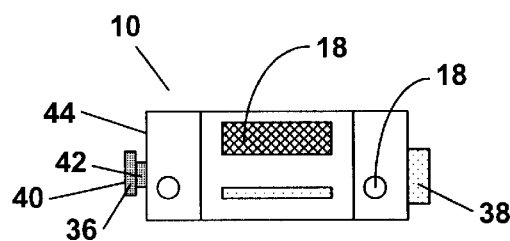
FIG. 17 depicts a top view of the deterioration resistant retaining wall planter block of FIG. 14.

FIG. 13 depicts another embodiment of a multi-unit retaining wall planter block 54, which can be configured to accommodate a curved terrain. In this embodiment of the present invention, tabs 58 may be positioned between each individual unit 34 on the front and/or back of the multi-unit block 54. If a curved wall is desired, the tabs 58 may be disengaged, thereby allowing the multi-unit block 54 to be maneuvered into convex and/or concave positions.

Another type of anchoring device 20 included in the present invention may be a side locking mechanism. As depicted in FIGS. 14–17 one or more interlocking keys 36 and locks 38 may be included in the retaining block. Each key 36 may include a rounded relatively flat cylinder 40 adjoined to a neck 42 that is attached to the side wall 44 of a retaining planter block 10. Each lock 38 comprises a partially enclosed cavity 46, which is configured to receive and securely retain the key 36 when inserted into the lock 38.

Figure 18:
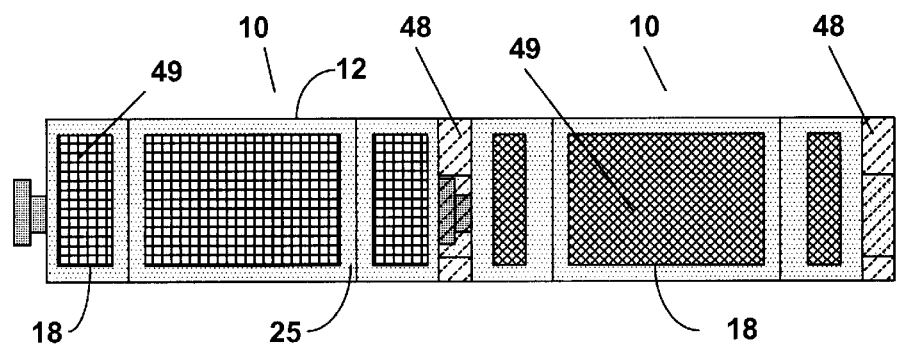
FIG. 18 depicts a front view of a deterioration resistant retaining wall incorporating wings that cover the interlocking keys and locks.

As depicted in FIG. 18, wings 48 located on the front of each retaining planter block 10 function to hide the key and lock system from the view of an observer of the retaining wall. The retaining wall planter blocks 10 of the present invention may also include other side attachments, such as hook and pile attachments (not shown) or any other side attachment suitable for interlocking more than one retaining wall planter block 10.

FIG. 18 further illustrates an embodiment of the present invention wherein the apertures 18 include aperture covers 49 for allowing growth of vegetation to occur. The aperture covers 49 may be a nonbiodegradable or biodegradable screen, meshing or other configuration comprised of cloth, plastic, paper, cardboard, metal or any other suitable material. Furthermore, the aperture cover may be a biodegradable and/or deteriorating coating that retains the fill material and seeds but, allows for vegetation growth. An example of such meshing may be made of jute, coir, burlap, biodegradable polymers or other biodegradable materials similar to the meshings produced by Hy-Tex (UK) Limited, PO Box 97, Aldington, ASHFORD, Kent TN25 7EA. It is noted that the biodegradable material, such as meshing, may also include substances such as fertilizer or pesticides that are released upon degradation of the biodegradable material.

The apertures 18 may be of any size and may include apertures 18 that cover a large portion of the outside walls 25 and top panel 12. Alternatively, the aperture covers 49 may completely cover the outside or inside of the retaining wall planter block 10 to ensure coverage and security of the apertures and thereby inhibit loss of fill material and/or seeds. An additional embodiment of the present invention may be a retaining wall planter block 10 wherein the top panel 12, bottom panel 14 and wall assembly 16 are comprised of the screens, grids and/or meshing to form the planter block 10. For example, a polymer planter block may be partially or completely perforated forming apertures that could support vegetative growth.

Figure 19:
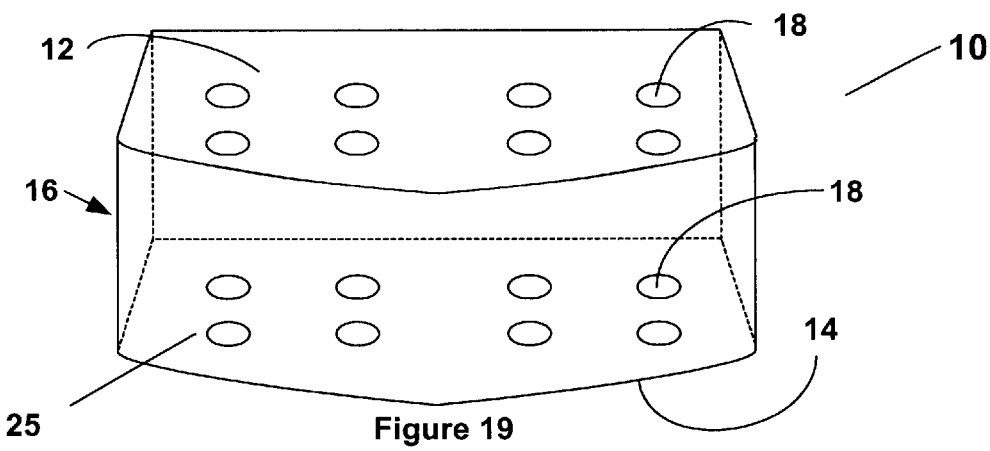
FIG. 19 depicts a perspective view of a deterioration resistant retaining wall planter block with a back panel aperture.
Figure 20:
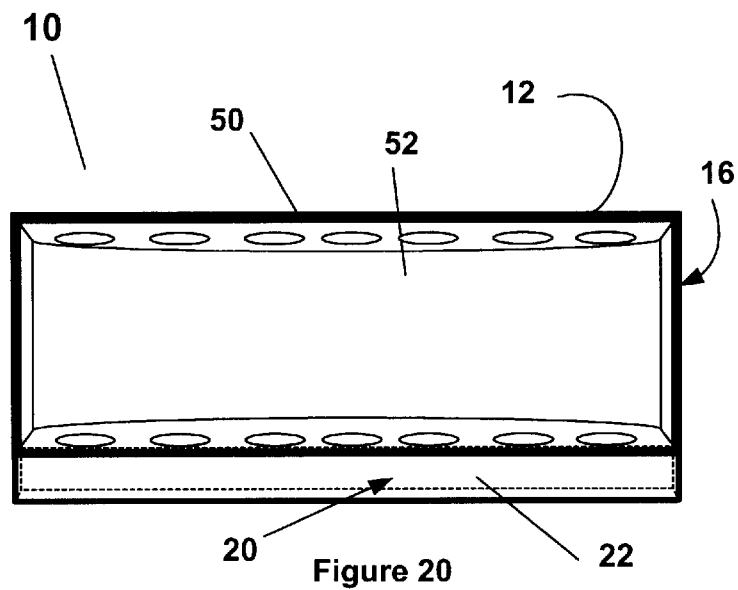
FIG. 20 depicts a perspective view of a deterioration resistant retaining wall planter block with a back panel aperture.
Figure 21:
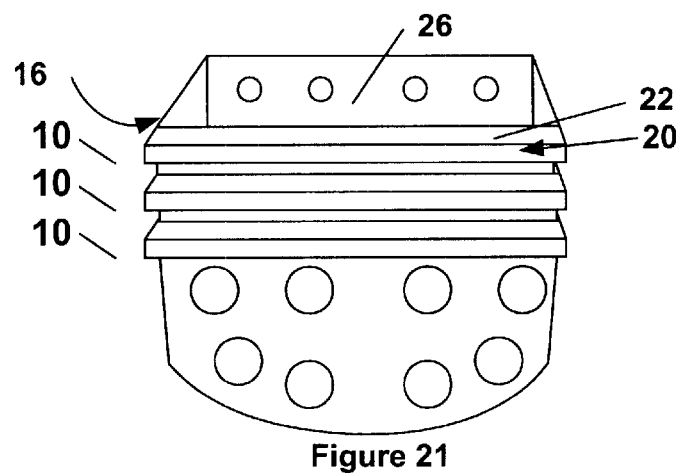
FIG. 21 depicts an embodiment of the present invention wherein the deterioration resistant retaining wall planter blocks are stacked.

The retaining wall planter block 10 depicted in FIGS. 19–21 include a top panel 12, a bottom panel 14 and a wall assembly 16 configured to form one or more chambers 26. Generally, the top panel 12 and bottom panel 14 only include apertures conducive to the growth of vegetation. Furthermore, the top panel 12, bottom panel 14 and wall assembly 16 may be a unitary structure or piece. The difference in this embodiment is that the back wall 50 includes one or more back apertures 52 that can be sealed, after it is filled, with a cover or other type of plugging device (not shown). The back apertures 52 can be of any shape and size and may extend to any or all of the side panels 16, top panel 12 and/or bottom panel 14. The embodiment depicted in FIGS. 19–21 may also include an anchoring device, such as a retaining flange 22 or any other type of anchoring device.

The embodiment of the present invention as depicted in FIG. 19 is preferably used when retaining walls are embedded into or positioned flush with a hill or other type of ridge thereby further sealing the one or more back apertures 52. The retaining wall planter block 10 may be filled with a filling material that may include seeds from the back and then placed into position on the retaining wall. Once in position on the retaining wall, the fill material utilized to secure and weight the retaining wall planter block 10 is maintained within the chamber 26 by the cover or plug and further by the soil, peat, sand, gravel, or similar material, which makes up the hill or ridge. An embodiment including multiple units (not shown) may also incorporate into the structure a back panel with one or more apertures. The multi-unit planter block of this embodiment may include multiple units arranged side by side vertically or horizontally.

The presence of an aperture positioned in the back wall 50 may also allow for easy storage and transport due to the stackable capabilities present. For example, an individual planter block 10 or a multi-unit block 54 may be inserted into the back of another planter block 10 or multi-unit block 54 thereby creating a stackable arrangement. An illustration of stacking individual planter blocks 10 is depicted in FIG. 21.

As previously mentioned, the present invention may be manufactured from a deterioration resistant, substantially rigid composite or polymeric material including, but not limited to, plastic, a rubber composition, fiberglass, or any other similar material or a combination thereof. Preferable materials comprise light-weight and slightly flexible. Generally, the embodiments of the present invention may comprise any type of material that would have the similar characteristics to plastic, vinyl, silicone, fiberglass, rubber or a combination of these materials. It is noted that the material utilized in the present invention should be rigid enough to hold its form upon addition of filling material and also when placed in contact with other objects. Another preferable material may be comprised of a material similar to that utilized in the production of some types of garbage cans or the utilization of recycled rubber from objects such as tires. Such materials would be capable of holding rigidity and still offer flexibility when placed in contact with other objects, such as ice. Also, such materials have the ability to regain its original form when the object or material has been removed.

Embodiments of the present invention may also vary in appearance. Since embodiments of the present invention may be manufactured by a process such as injection molding, the molds may include any type of design or shape. Furthermore, the front panels of the retaining wall planter block 10, as shown in FIGS. 4, 5 and 6, could be molded in almost any type of configuration. In one embodiment, multiple retaining wall planter blocks could be molded to include designs that, when positioned on a retaining wall, would complete a larger single design, such as the spelling of a company or school name in large letters or the completion of a large image. Also, since the present invention may be manufactured from a number of different products, such as plastic, a rubber composition or fiberglass, the retaining wall planter block may comprise any color or a multitude of colors. For example, a retaining wall installed in a beach setting may be manufactured of a plastic or rubber product and be colored to easily blend with the vegetation growing upon or within the retaining wall planter block.

Additionally, the apertures 18 may be positioned to accommodate vegetative growth in various desired designs, mosaics, words and/or shapes. Vegetative growth can be of many different colors and therefore can create colorful designs when emerging from the planter block 10.

Furthermore, the planter block of the present invention may be of any size. For example, the block may be sized similar to the blocks publicly available, which generally have a length of 10"–20", a width of 3"–8" and a depth of 4"–18". However, planter blocks of the present invention may also be sized much larger than the conventional block. For example, a block utilized on a shoreline may be of a very large size, such as dimensions as follows: length of 4'–8', width of 1'–3' and a depth of 2'–6'.

As previously suggested the environment resistant retaining wall planter block 10 is utilized in the construction of any type of wall or border. In application, a foundation is first created in the area that the wall or border is to be constructed. The foundation preferably is flat and or level and can accommodate one or more retaining planter blocks 10. Once a foundation is completed, a first row is laid by filling each individual retaining block 10 with a fill material and placing each individual or multi-unit planter block, side by side until the row is completed. The filling of the retaining wall planter block gives it the added weight that it needs to retain its structure and hold it in place. A funneling device may be utilized, which fits securely into the openings or apertures of the retaining wall planter block to guide fill into the chamber of the block. The first row may be straight or rounded. An example of a rounded first row is depicted in FIG. 20. Upon completion of the first row, additional rows are constructed by performing the same filling process and placing the retaining wall planter block 10 in the proper position atop the previously completed row until a continuous retaining wall is completed. Generally, a continuous retaining wall includes stacked rows wherein individual retaining planter blocks are placed adjacently to one another thereby eliminating or minimizing cracks or gaps in the wall.

Retaining wall planter blocks 10 may be positioned directly over other retaining wall planter blocks 10 in lower rows or may be staggered. Furthermore, the retaining wall planter blocks 10 of the upper rows may overlap the back of retaining wall planter blocks 10 of lower rows if a retaining flange 24 is included on the block. In the alternative or additionally, each individual retaining block 10 may be locked into position with adjacent blocks if pegs 24 and apertures 18 or keys 36 and locks 38 are present on the retaining block 10. Upon completion of the top row of the retaining wall, a cover may or may not be placed over the top row to close the apertures 18 of the top panels 12 or to provide a finishing border to the top of the retaining wall. The cover may include apertures as depicted in FIG. 9.

Embodiments of the present invention may also be used in conjunction with regular keystone bricks or stones. A retaining wall constructed in water or along a waterfront property may utilize the retaining wall planter block of the present invention at water level and below and then the regular keystone or retaining wall materials can be used on top of the retaining wall planter block of the present invention. The utilization of the retaining wall planter block of the present invention would be easy to match colors with the conventional retaining wall building materials because the materials utilized to manufacture the present invention can be colored and designed to match virtually any type of retaining wall construction material.

Furthermore, the retaining wall planter block may be manufactured in a multitude of different sizes, shapes and configurations. For example, an embankment or steep shoreline could support a retaining wall configured in a step like arrangement or design. Such a structure, may be utilized as a retaining wall and/or as a grassy stairway down to a beach or to the water if vegetation is growing from the planter block.

While the invention has been illustrated and described in detail in the drawings and foregoing description, such an illustration and description is to be considered as exemplary and not restrictive in character, it being understood that only the preferred embodiments have been shown and described and that all changes and modifications that come within the spirit of the invention are desired to be protected.

What is claimed is:

1. A deterioration resistant retaining wall planter block comprising:
   a top panel including a deterioration resistant composite or polymeric material;
   a bottom panel including a deterioration resistant composite or polymeric material;
   a wall assembly including a deterioration resistant composite or polymeric material that is adjoined to the top panel and bottom panel to form a chamber;
   one or more fill materials suitable for the growth of vegetation administered to the chamber;
   one or more vegetation seeds included in or applied to the fill materials; and
   one or more apertures positioned on the top panel, bottom panel, wall assembly, or any combination thereof.

2. The deterioration resistant planter block of claim 1 wherein the composite or polymeric material is a material selected from the group consisting of plastic, vinyl, silicone, rubber, fiberglass or any combination thereof.

3. The deterioration resistant planter block of claim 1, wherein the one or more apertures allow for the growth of vegetation and root interaction.

4. The deterioration resistant planter block of claim 3, wherein the apertures are covered internally or externally by one or more aperture covers.

5. The deterioration resistant planter block of claim 4, wherein the aperture cover includes a bio-degradable material.

6. The deterioration resistant planter block of claim 1, wherein the top panel, bottom panel or wall assembly includes a removable or hingedly adjoined cover.

7. The deterioration resistant planter block of claim 1, wherein die planter block further includes one or more interior partitions.

8. The deterioration resistant planter block of claim 1, wherein the planter block further includes more than one unit.

9. The deterioration resistant planter block of claim 8, wherein the planter block further includes one or more disengaging tabs.

10. The deterioration resistant planter block of claim 1, wherein the planter block further includes one or more anchoring devices.

11. The deterioration resistant planter block of claim 10, wherein the anchoring devices are selected from a group consisting of one or more retaining flanges, pegs, and locking mechanisms.

12. The deterioration resistant planter block of claim 1, wherein the fill materials are selected from a group consisting of dirt, peat, seeds, sand, gravel, crushed rock, or combination thereof.

13. The deterioration resistant planter block of claim 1, wherein the planter block is a unitary structure.

14. The deterioration resistant planter block of claim 1, wherein the planter block apertures are positioned on the planter block in a configuration to form a design.

15. A method of constructing a deterioration resistant retaining wall comprising
   establishing a foundation that can support more than one deterioration resistant planter block, said deterioration resistant planter blocks comprised of a deterioration resistant composite or polymeric material and including a top panel and bottom panel that are adjoined to a wall assembly to form a chamber for receiving and retaining organic fill material suitable for the growth of vegetation, and one or more apertures positioned on the top panel, bottom panel, wall assembly, or any combination thereof;
   filling more than one retaining planter blocks with a fill material;
   placing one or more retaining planter blocks side by side on the foundation to generate a straight or curved row; and
   stacking one or more rows wherein each row is stacked upon the row below it and the rows are staggered to form a continuous retaining wall.

16. A deterioration resistant retaining wall planter block comprising:
   a top panel including a deterioration resistant composite or polymeric material;
   a bottom panel including a deterioration resistant composite or polymeric material;
   a wall assembly including a deterioration resistant composite or polymeric material that is adjoined to the top panel and bottom panel to form a chamber for receiving and retaining one or more fill materials suitable for the growth of vegetation; and
   one or more apertures positioned on the top panel, bottom panel, wall assembly, or any combination thereof; and
   one or more biodegradable aperture covers for initial securing of the fill material into the chamber.

17. A method of constructing a deterioration resistant retaining wall comprising
   establishing a foundation that can support more tan one deterioration resistant planter block, said deterioration resistant planter blocks comprised of a deterioration resistant composite or polymeric material and including a top panel and bottom panel that are adjoined to a wall assembly to form a chamber for receiving and retaining organic fill material suitable for the growth of vegetation, and one or more apertures positioned on the top panel, bottom panel, wall assembly, or any combination thereof;
   filling more than one retaining planter blocks with a fill material;
   placing one or more retaining planter blocks side by side on the foundation to generate a straight or curved row;
   engaging the planter blocks with anchoring devices, root interaction, or a combination thereof; and
   stacking one or more rows wherein each row is stacked upon the row below it to form a continuous retaining wall.

18. The method of constructing a deterioration resistant retaining wall of claim 17, wherein the anchoring devices are selected from a group consisting of one or more retaining flanges, pegs, locking mechanisms, and root interaction.

19. A deterioration resistant retaining wall comprising a plurality of planter blocks positioned side by side and stacked to form a continuous retaining wall, said planter blocks including:

a top panel including a deterioration resistant composite or polymeric material;

a bottom panel including a deterioration resistant composite or polymeric material;

a wall assembly including a deterioration resistant composite or polymeric material that is adjoined to the top panel and bottom panel to form a chamber for receiving and retaining one or more fill materials suitable for the growth of vegetation;

one or more apertures positioned on the top panel, bottom panel, wall assembly, or any combination thereof; and one or more aperture covers including a bio-degradable material for internal or external covering of the apertures.

\* \* \* \* \*